(12) United States Patent
Stenhouse (10) Patent No.: US 9,829,151 B1
(45) Date of Patent: Nov. 28, 2017

(54) HEIGHT ADJUSTABLE FLAT PANEL DISPLAY MOUNTS

(71) Applicant: MW Products LLC, Phoenix, AZ (US)

(72) Inventor: Brett Stenhouse, Phoenix, AZ (US)

(73) Assignee: MW Products LLC, Phoenix, AZ (US)

( * ) Notice: Subject to any disclaimer, the term of this patent is extended or adjusted under 35 U.S.C. 154(b) by 0 days.

(21) Appl. No.: 14/602,218

(22) Filed: Jan. 21, 2015

Related U.S. Application Data (60) Provisional application No. 61/929,938, filed on Jan. 21, 2014.

(51) Int. Cl.
*F16M 13/02* (2006.01)
*F16M 11/06* (2006.01)

(52) U.S. Cl.
CPC .......... *F16M 13/022* (2013.01); *F16M 11/06* (2013.01)

(58) Field of Classification Search
CPC ........ F16M 11/12; F16M 11/18; F16M 13/02; F16M 11/045; F16M 11/046; F16M 11/10; F16M 11/048; F16M 13/022; F16M 11/06
USPC ............ 248/201, 286.1, 298.1, 277.1, 276.1, 248/288.11, 220.21, 222.51, 309.1, 176.1, 248/231.91, 923, 917, 919, 220.22, 284.1, 248/317, 292.14
See application file for complete search history.

(56) References Cited

U.S. PATENT DOCUMENTS

| | | | | |
|---|---|---|---|---|
| 2,187,870 A | * | 1/1940 | Veccia | G09F 1/14 40/610 |
| 2,522,901 A | * | 9/1950 | Schrager | A47G 1/202 211/103 |
| 2,697,572 A | * | 12/1954 | Pfankuch | A47G 1/202 248/234 |
| 3,188,028 A | * | 6/1965 | Waller | A47G 1/215 248/316.8 |
| 5,878,987 A | * | 3/1999 | Hayde | A47G 1/1613 248/477 |
| 6,604,722 B1 | * | 8/2003 | Tan | F16M 11/10 248/276.1 |
| 7,316,379 B1 | * | 1/2008 | Graham | F16M 13/02 248/298.1 |
| D581,914 S | | 12/2008 | Bures et al. | |
| D587,036 S | | 2/2009 | Russell et al. | |
| D587,504 S | | 3/2009 | Russell et al. | |
| D591,756 S | | 5/2009 | Wohlford et al. | |
| D593,080 S | | 5/2009 | Russell et al. | |
| D595,277 S | | 6/2009 | Bremmon et al. | |
| D595,702 S | | 7/2009 | Bremmon et al. | |
| D595,723 S | | 7/2009 | Bures et al. | |

(Continued)

OTHER PUBLICATIONS

Sanus Systems, "The Leader in Mounting Technology", Oct. 2009.

*Primary Examiner* — Muhammad Ijaz
(74) *Attorney, Agent, or Firm* — Lewis Roca Rothgerber Christie LLP (57) ABSTRACT

A height-adjustable flat panel display mount is provided. The height-adjustable flat panel display mount may include a wall plate that couples to a wall. The vertical rails may couple to a flat panel display. The vertical rails may also couple to the wall plate by way of one or more independent height-adjustment mechanisms. Adjusting one of the height-adjustment mechanisms in a first direction elevates the vertical rail to which it is coupled with respect to the floor, while adjusting the mechanism in the opposite direction lowers the vertical rail.

11 Claims, 8 Drawing Sheets

(56) References Cited

U.S. PATENT DOCUMENTS

| | | |
|---|---|---|
| D596,189 S | 7/2009 | Bures et al. |
| D605,185 S | 12/2009 | Russell et al. |
| D610,436 S | 2/2010 | Bremmon et al. |
| D610,437 S | 2/2010 | Bremmon et al. |
| D612,182 S | 3/2010 | Bremmon et al. |
| D620,943 S | 8/2010 | Grey et al. |
| D624,061 S | 9/2010 | Smith et al. |
| 7,793,903 B2 | 9/2010 | Dittmer et al. |
| D627,787 S | 11/2010 | Grey et al. |
| 7,823,847 B2 | 11/2010 | Bremmon et al. |
| 7,891,622 B1 * | 2/2011 | O'Keene ............... F16M 11/10 16/358 |
| D634,328 S | 3/2011 | Grey et al. |
| 7,975,976 B2 | 7/2011 | Wohlford |
| D642,583 S | 8/2011 | Dittmer et al. |
| D643,421 S | 8/2011 | Russell et al. |
| D662,103 S | 6/2012 | Brandt |
| D662,104 S | 6/2012 | Brandt |
| D666,207 S | 8/2012 | Brandt |
| 8,235,342 B2 | 8/2012 | Pfister et al. |
| 8,254,092 B2 | 8/2012 | Russell et al. |
| 8,262,044 B2 * | 9/2012 | Luijben ............... F16M 11/10 248/276.1 |
| 8,456,808 B2 * | 6/2013 | Grey ............... F16M 11/10 248/201 |
| 8,550,415 B2 * | 10/2013 | Sculler ............... H05K 5/0017 248/291.1 |
| 8,693,172 B2 | 4/2014 | Russell et al. |
| 8,746,642 B2 * | 6/2014 | Molter ............... F16M 11/10 248/284.1 |
| 8,910,804 B2 * | 12/2014 | Kim ............... F16M 11/045 211/87.01 |
| 9,027,893 B2 * | 5/2015 | Cheng ............... F16M 13/022 248/201 |
| 2005/0109892 A1 * | 5/2005 | Bober ............... A47B 81/064 248/125.2 |
| 2007/0041150 A1 * | 2/2007 | Short ............... F16M 11/2014 361/679.22 |
| 2008/0210837 A1 * | 9/2008 | Burns ............... F16M 11/10 248/291.1 |
| 2009/0184221 A1 * | 7/2009 | Sculler ............... F16M 13/02 248/221.11 |
| 2010/0006725 A1 * | 1/2010 | Kim ............... F16M 11/10 248/222.51 |
| 2010/0039755 A1 * | 2/2010 | Chen ............... F16M 11/10 361/679.01 |
| 2010/0258696 A1 * | 10/2010 | Cheng ............... F16M 11/046 248/297.31 |
| 2010/0309615 A1 * | 12/2010 | Grey ............... F16M 11/10 361/679.01 |
| 2011/0163052 A1 * | 7/2011 | Kim ............... F16M 11/045 211/49.1 |
| 2011/0174939 A1 * | 7/2011 | Taylor ............... F16M 11/10 248/201 |
| 2011/0297810 A1 * | 12/2011 | Tachibana ............ F16M 11/041 248/278.1 |
| 2013/0206943 A1 * | 8/2013 | Molter ............... F16M 11/10 248/299.1 |

* cited by examiner

HEIGHT ADJUSTABLE FLAT PANEL DISPLAY MOUNTS

CROSS-REFERENCE TO RELATED APPLICATIONS

This application claims the priority benefit of U.S. provisional application No. 61/929,938 filed Jan. 21, 2014, the disclosure of which is incorporated herein by reference.

BACKGROUND

Flat panel displays have become commonplace in American homes and businesses. Today, the term "flat plat display" encompasses a wide variety of electronic visual display technologies, including liquid crystal displays (LCDs), light-emitting diode (LED)-backlit LCDs, plasma display panels (PDPs), and electroluminescent displays (ELDs), to name a few. Unlike many modern technologies, the advancement of which have largely resulted in smaller and smaller device sizes, flat panel displays have grown larger in size as the market has progressed. Larger screen sizes provide increased surface area for presenting electronic visual displays, such as television shows, movies, or slideshow presentations. As flat panel displays have continued to grow in overall size, consumers have recognized the need to store such displays in a way that provides optimal utility without taking up significant floor space. One approach includes mounting a flat panel display on a wall. Wall-mounted flat panel displays not only avoid cluttering a room by obviating the need for an entertainment center or other bulky support structure, they also provide convenient, eye-level access for viewers.

But mounting a flat panel display on a wall presents certain challenges for consumers. One such challenge involves ensuring that a mounted flat panel is level with the plane of the floor. Although numerous flat panel display mounts are available on the market today, they are limited in their ability to offer easy and convenient post-mount leveling or height adjustments. Many flat panel displays must be repeatedly unmounted, adjusted, and remounted to achieve a level orientation or a desired height from the floor. Others include features directed to post-mount leveling or height adjustments, but in doing so add unnecessary bulk to the overall design (e.g., extra rails or cross-members that are otherwise unnecessary for supporting the mounted flat panel display). In doing so, they increase manufacturing costs, shipping expenses, and assembly complexity. Moreover, some such designs require consumers to obtain and use specialty driving tools, such as hex wrenches or a power drill. Often times, consumers are limited to the most basic of everyday tools (e.g., a screwdriver) and do not have the necessary specialty driving tools on hand. As a result, such designs impose an added expense either on the consumer, who must locate and purchase the specialty driving tool, or on the manufacturer, who must purchase and supply it to the consumer. In the latter case, the consumer sometimes unknowingly experiences an uptick in the retail price of the mount even when the manufacturer does include the specialty driving tool.

Thus, consumers need a leanly designed flat panel display mount that offers simple and easy-to-use leveling and height adjustments without requiring specialty driving tools.

SUMMARY OF THE CLAIMED INVENTION

A height-adjustable flat panel display mount is provided. In one claimed embodiment, the height-adjustable flat panel display mount includes a wall plate configured to couple to a wall. The mount includes a plurality of retaining members each directly coupled to a horizontal support member of the wall plate. Each retaining member includes a horizontal rod and is stationary when coupled to the horizontal support member. The mount further includes a plurality of vertical rails configured to couple to a flat panel display. A plurality of heights of the vertical rails with respect to the floor are adjustable independent from one another. Each of the vertical rails includes a vertical slot and is coupled with the horizontal rod of one of the stationary retaining members such that a height of the vertical slot with respect to the horizontal rod is adjustable. The mount further includes a plurality of screws, each of which is coupled to a top surface of one of the vertical rails through a threaded hole. Rotating the screw in a first direction drives an increased length of the screw downward through the threaded hole in the top surface of the vertical rail and thereby elevates the vertical rail with respect to the floor. Driving the screw in a second direction opposite the first direction extracts an increased length of the screw upward through the threaded hole and thereby lowers the vertical rail with respect to the floor. Each of the retaining members remains stationary despite the screw being rotated in either of the first or second directions In another claimed embodiment, a height-adjustable flat panel display mount includes a wall plate configured to couple to a wall. The mount includes a plurality of stationary retaining members each directly coupled to a horizontal support member of the wall plate. Each retaining member includes a vertical slot and is stationary when coupled to the horizontal support member. The mount includes a plurality of vertical rails configured to couple to a flat panel display. A plurality of heights of the vertical rails with respect to the floor are adjustable independent from one another. Each of the vertical rails includes a horizontal rod coupled to the vertical slot of one of the stationary retaining members such that a height of the horizontal rod within the vertical slot is adjustable. The mount further includes a plurality of screws, each of which is coupled to a top surface of one of the vertical rails through a threaded hole. Rotating the screw in a first direction drives an increased length of the screw downward through the threaded hole in the top surface of the vertical rail and thereby elevates the vertical rail with respect to the floor. Rotating the screw in a second direction opposite the first direction extracts an increased length of the screw upward through the threaded hole and thereby lowers the vertical rail with respect to the floor. Each of the retaining members remains stationary despite the screw being rotated in either of the first or second directions.

In a third claimed embodiment, a height-adjustable flat panel display mount includes a wall plate configured to couple to a wall. The mount includes a plurality of stationary retaining members each directly coupled to a horizontal support member of the wall plate. Each retaining member includes a vertical slot and is stationary when coupled to the horizontal support member. The mount includes a plurality of vertical rails configured to couple to a flat panel display. A plurality of heights of the vertical rails with respect to the floor are adjustable independent from one another. Each of the vertical rails includes a horizontal rod coupled to the vertical slot of one of the stationary retaining members such that a height of the horizontal rod within the vertical slot is adjustable. The mount further includes a plurality of screws, each of which is coupled to a top surface of one of the vertical rails through a threaded hole. Rotating the screw in a first direction drives the screw downward through the threaded hole in the top surface of the vertical rail and thereby elevates the vertical rail with respect to the floor. Rotating the screw in a second direction opposite the first direction extracts the screw upward through the threaded hole and thereby lowers the vertical rail with respect to the floor. Each of the retaining members remains stationary despite the screw being rotated in either of the first or second directions.

DETAILED DESCRIPTION

A height-adjustable flat panel display mount is provided. Although the novel mount is illustrated in this disclosure by way of exemplary configurations and designs, it should be understood that the embodiments described herein are exemplary only and are in no way limiting. Persons of ordinary skill in the art will readily recognize and appreciate that the present disclosure suggests many other possible embodiments in addition to those expressly described herein.

Figure 1:
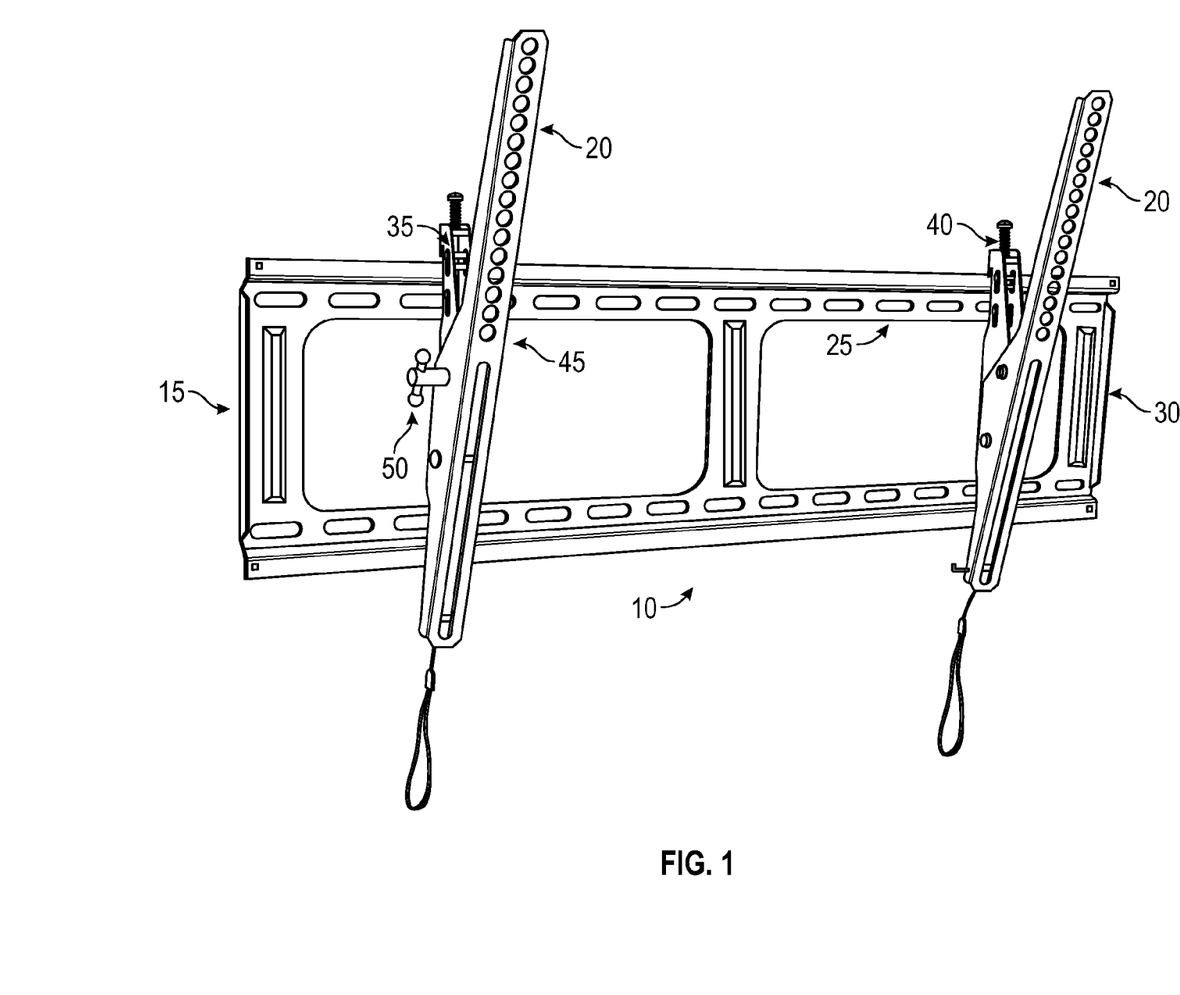
FIG. 1 is a perspective view of an exemplary height-adjustable flat panel display mount.

FIG. 1 is a perspective view of an exemplary height-adjustable flat panel display mount 10. Height-adjustable flat panel display mount 10 may include a wall plate 15 and one or more vertical rails 20. Wall plate 15 couples to a vertical wall, while vertical rails 20 couple to the rear side of a flat panel display. In this disclosure, a component referred to as "vertical" means that the longitudinal axis of the object is disposed substantially perpendicular to the plane of the floor. Wall plate 15 may include one or more stationary horizontal support members 25 coupled or attached to one or more stationary vertical support members 30 to form a stationary support structure. In this disclosure, a component referred to as "horizontal" means that the longitudinal axis of the object is disposed substantially parallel to the plane of the floor. In some embodiments, like the one shown in FIG. 1, horizontal support members 25 and vertical support members 30 may form a frame that includes voids between the members. Vertical rails 20 may each couple a top stationary horizontal support member 25 of wall plate 15 by way of a height-adjustment mechanism 35. Height-adjustment mechanism 35 may include a screw 40. Screw 40 may include a recess shaped to mate with a standard Phillips-head screwdriver (also referred to as a "cross-head" screwdriver) or a standard flathead screwdriver.

Figure 4:
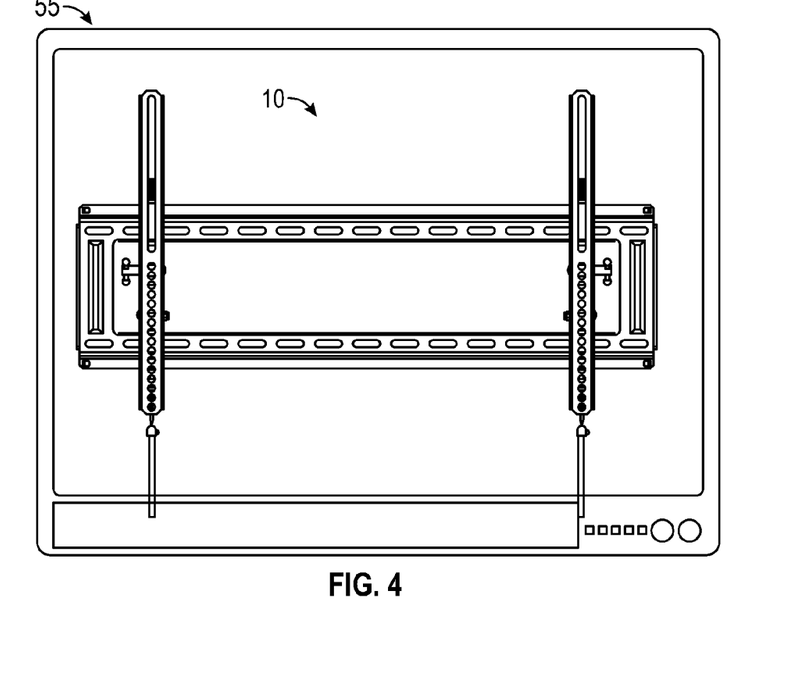
FIG. 4 is a front view of an exemplary height-adjustable flat panel display mount coupled to a flat panel display.

Vertical rails 20 may also couple to a rear side of a flat panel display (as shown in FIG. 4). In some embodiments, vertical rails 20 may include a plurality of sub-rails 45 that are adjustably coupled to one another by a tilt mechanism 50. In such embodiments, one such subrail 45 of each vertical rail 20 may be adjustably tilted using tilt mechanism 50. When sub-rails 45 are titled, any flat panel display coupled to sub-rails 45 likewise tilts to suit the viewing needs of the consumer. Persons of ordinary skill in the art will readily recognize that some embodiments of height-adjustable flat panel display mount 10 may include the foregoing tilting feature, while others may omit it depending on various design considerations, such as available materials, goals related to design size, target retail price, intended use, and other factors.

In some embodiments, wall plate 15 may be collapsible in an accordion-like fashion like that described in commonly assigned U.S. patent application Ser. No. 13/797,668 entitled "Flexible Mount Apparatus and System," the disclose of which is incorporated herein.

Figure 2:
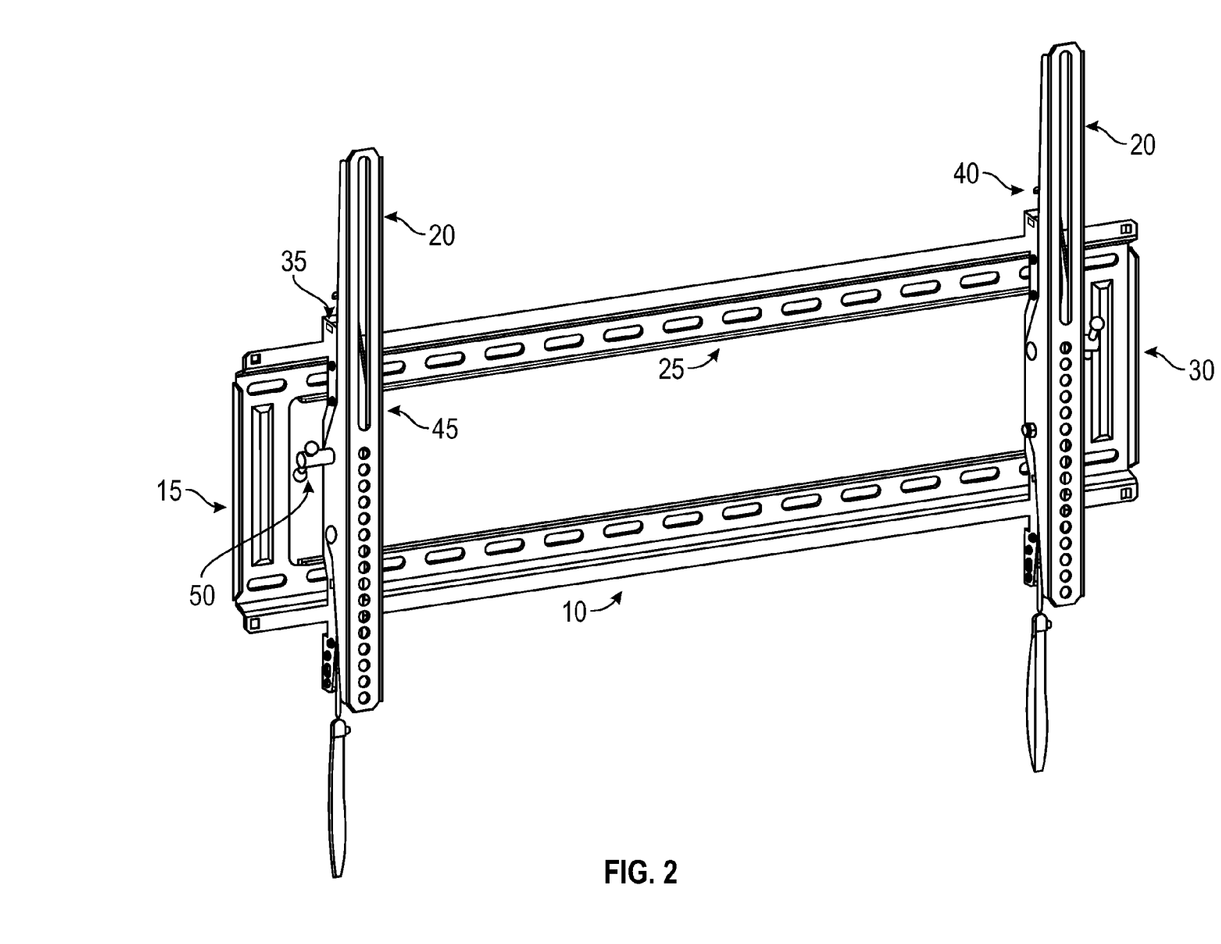
FIG. 2 is another perspective view of an exemplary height-adjustable flat panel display mount.

FIG. 2 is another perspective view of an exemplary height-adjustable flat panel display mount. As shown in FIG. 2, vertical rails 20 are disposed in a non-tilted orientation. As a result, sub-rails 45 of each vertical rail 20 are disposed substantially parallel to one another.

Figure 3:
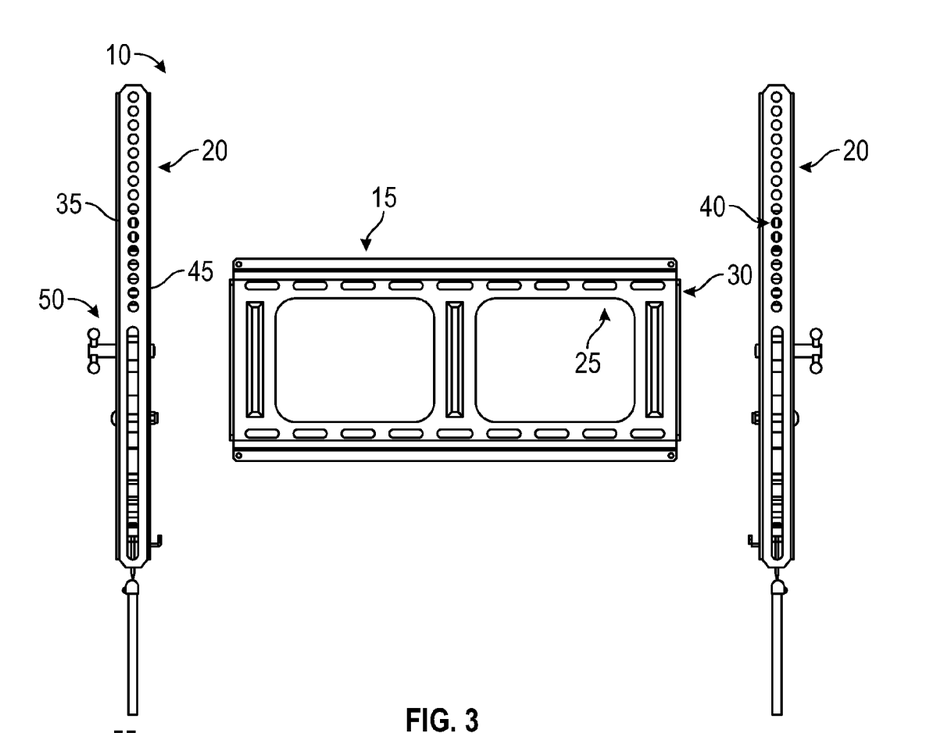
FIG. 3 is a partially-exploded front view of an exemplary height-adjustable flat panel display mount.

FIG. 3 is a partially-exploded front view of an exemplary height-adjustable flat panel display mount 10. FIG. 4 is a front view of an exemplary height-adjustable flat panel display mount coupled to a flat panel display 55. Flat panel display 55 may include any known electronic visual display technology. For instance, flat panel display 55 may be an LCD television or monitor, an LED-backlit LCD television or monitor, a PDP television or monitor, or an ELD television or monitor. Persons of ordinary skill in the art will readily recognize and appreciate that other types of flat panel displays, including those presently existing and developed in the future, may be coupled to various embodiments of height-adjustable flat panel display mount 10.

Figure 5:
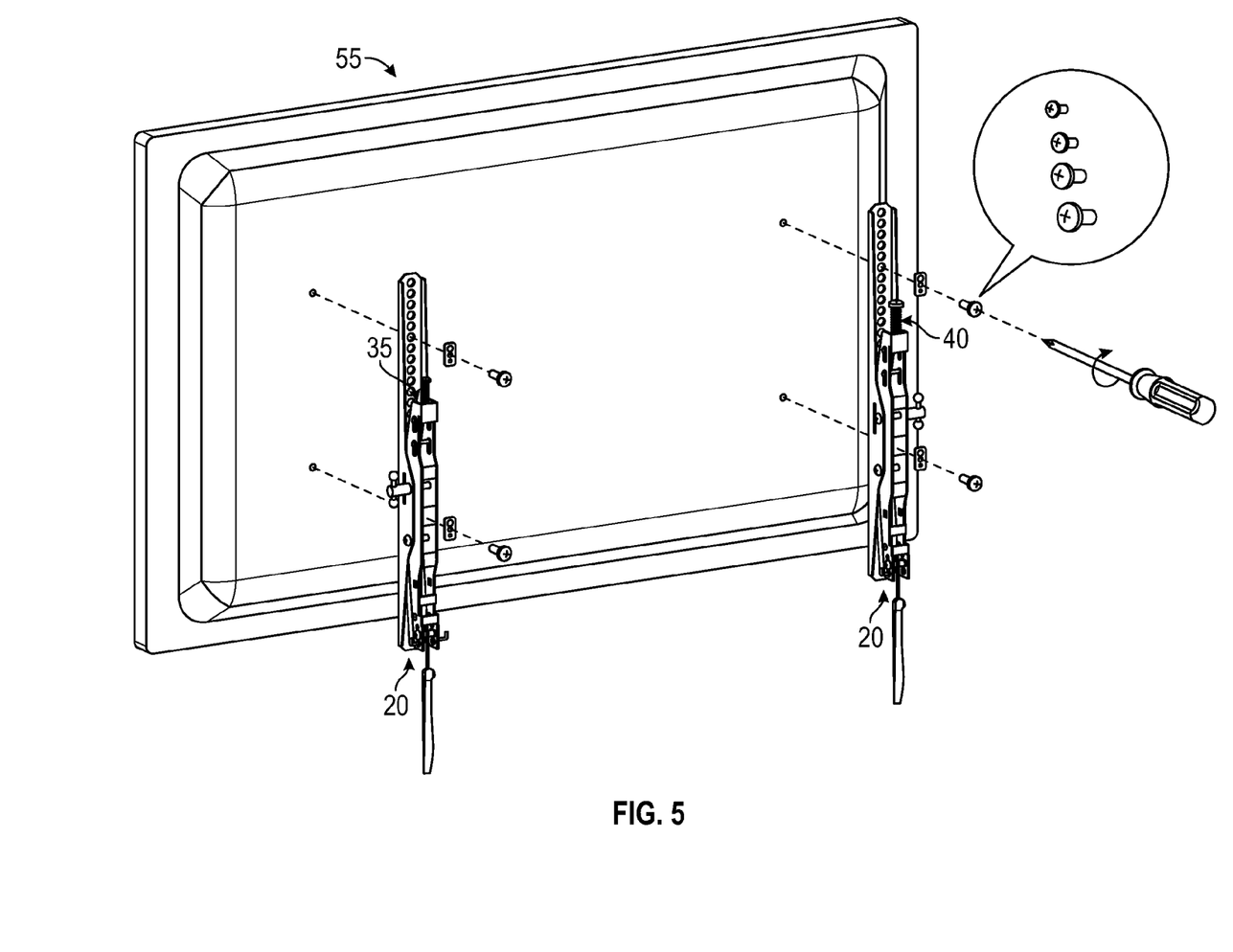
FIG. 5 is a perspective view of vertical rails of an exemplary height-adjustable flat panel display mount being coupled to a flat panel display without the use of specialty driving tools.

FIG. 5 is a perspective view of vertical rails of an exemplary height-adjustable flat panel display mount 10 being coupled to flat panel display 55 without the use of specialty driving tools (e.g., a hex wrench or a power drill). As shown in FIG. 5, vertical rails 20 may be coupled to a rear side of flat panel display 55 using the most basic of everyday tools and hardware, such as a standard cross-head or flat-head screwdriver and corresponding screws.

Figure 6A:
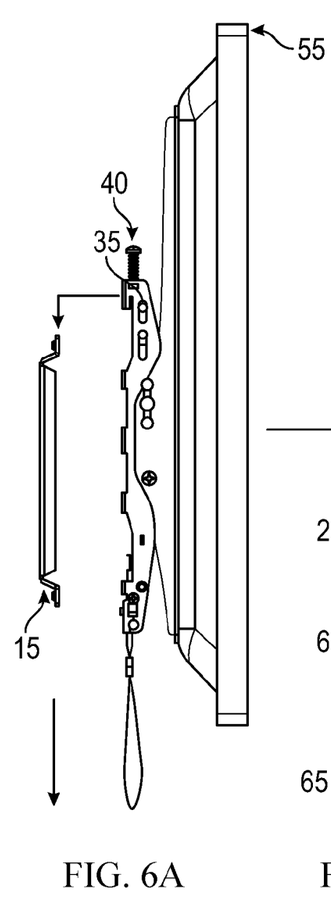
FIGS. 6A-6C illustrate a sequence of side views of an exemplary height-adjustable flat panel display mount coupled to a flat panel display.
Figure 6B:
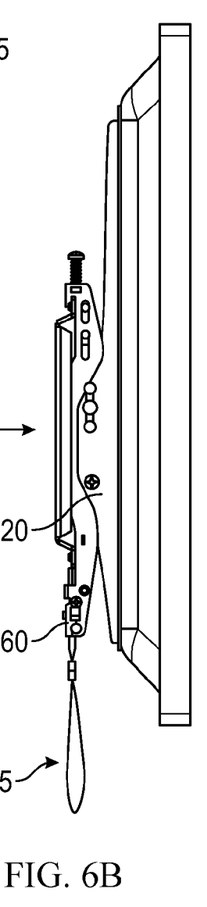
Figure 6C:
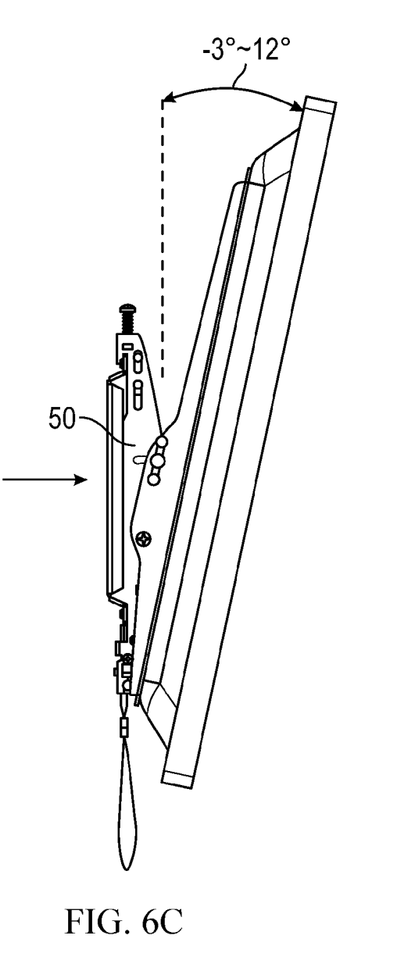

FIGS. 6A-6C illustrate a sequence of side views of an exemplary height-adjustable flat panel display mount 10 coupled to flat panel display 55. After wall plate 15 has been coupled to a vertical wall and vertical rails 20 of height-adjustable flat panel display mount 10 have been coupled to the rear side of flat panel display 55, vertical rails 20 may be coupled to wall plate 15 by way of one or more independent height-adjustment mechanisms 35 as shown in FIGS. 6A-6C. In some embodiments, height-adjustable flat panel display mount 10 may include one or more locking mechanisms 60 that lock vertical rails 20 to wall plate 15. Locking mechanisms 60 may each include a locking strap 65 that may be pulled downward to engage locking mechanism 60 against vertical rail 20 upon which locking mechanism 60 is disposed. FIG. 6C further illustrates the above-described tilting functionality, which may be effectuated through the rotational manipulation of tilt mechanism 50. In one embodiment, tilt mechanism 50 may allow flat panel display 55 to tilt three to twelve degrees forward with respect to tilt mechanism 50. In other embodiments, tilt mechanism 50 may permit other ranges of tilting depending on the intended application of flat panel display 55 and other design considerations.

Figure 7:
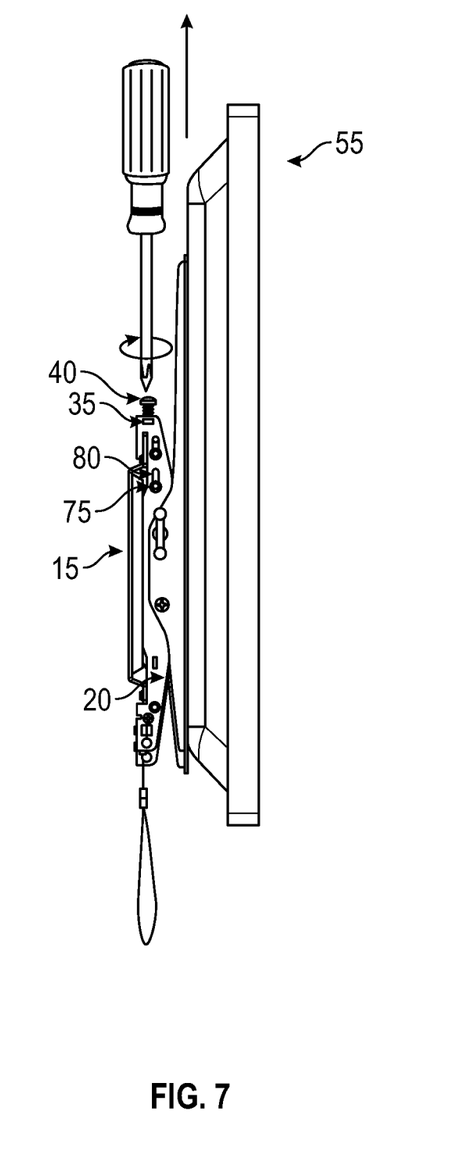
FIG. 7 is another side view of an exemplary height-adjustable flat panel display mount coupled to a flat panel display.

FIG. 7 is another side view of an exemplary height-adjustable flat panel display mount 10 coupled to a flat panel display 55. As shown in FIG. 7, height-adjustment mechanism 35 of each vertical rail 20 may be manually manipulated to raise or lower the respective vertical rail 20 to which height-adjustment mechanism 35 is coupled. Height-adjustment mechanism 35 may include a retaining member 70 (shown in FIG. 8C) and one or more height-adjustment members 75. Retaining member 70 may be integrated with or coupled to vertical rail 20. In one embodiment, screw 40 may be coupled to a retaining member 70 by a nut or other suitable fastening hardware. Height-adjustment members 75 may mate with slots 80 of vertical rail 20 such that when screw 40 is turned in a first direction in which it is forced downward towards the floor, the resulting tension raises vertical rails 20 with respect to the floor and causes height-adjustment members 75 to slide downwardly within slots 80. Conversely, height-adjustment mechanism 35 may be manually manipulated using screw 40 to lower vertical rails 20 with respect to the floor by turning screw 40 in a second direction opposite to the first direction such that the screw moves in an upwards direction away from the floor.

Each vertical rail 20 may include its own height-adjustment mechanism 35, each of which may move independent from any other height-adjustment mechanism 35. As a result, each vertical rail 20 may be height-adjusted independently of any other vertical rail 20. In such cases, height-adjustment mechanism 35 not only provides for height-adjustment functionality, but it also provides for simple and easy-to-use leveling functionality. When one vertical rail 20 is disposed disproportionally lower to the ground than the other, a user need only raise the disproportionally low vertical rail 20 using height-adjustment mechanism 35. Alternatively, the user could instead lower the one or more other vertical rails 20 using their respective, independent height-adjustment mechanisms 35. Each height-adjustment mechanism 35 may include a screw 40. Screw 40 may include a recess shaped to mate with a standard cross-head or flat-head screwdriver. As a result, height-adjustment mechanism 35 may be manually manipulated without the use of specialty driving tools, such as hex wrenches or a power drill. Because height-adjustment mechanisms 35 couple vertical rails 20 to wall plate 15 and do not require any additional cross-members to raise and lower vertical rails 20, height-adjustment mechanisms 35 allow the overall design of height-adjustable flat panel display mount 10 to remain simple, leanly designed, easy-to-use, and low cost.

Embodiments of height-adjustable flat panel display mount 10 provide for convenient post-mounting height and leveling adjustments. Wall plate 15 remains coupled to the wall during such adjustments. The height of each vertical rail 20, by virtue of being coupled to wall plate 15 through an independently moveable height-adjustment mechanism 35, may be height-adjusted while remaining coupled to wall plate 15.

Figure 8A:
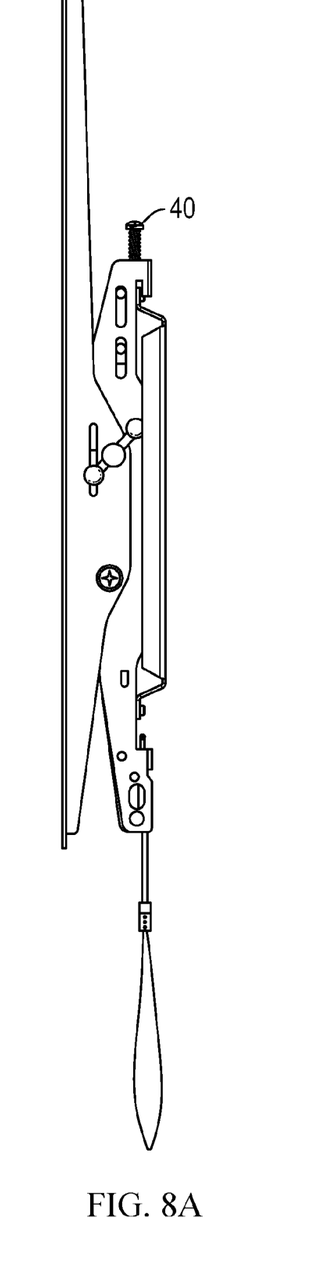
FIGS. 8A-8B illustrate a sequence of side views of an exemplary height-adjustable flat panel display mount being height-adjusted.
Figure 8B:
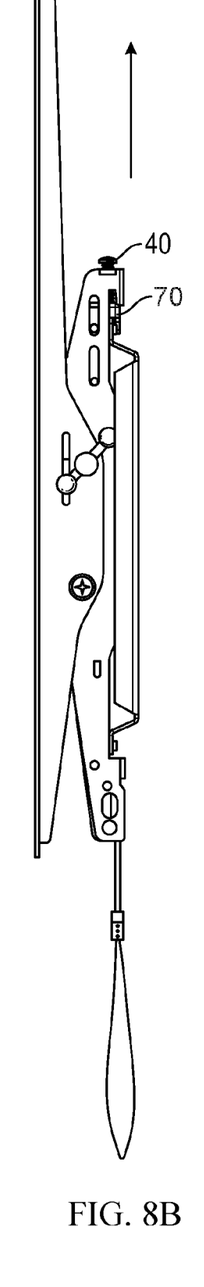
Figure 8C:
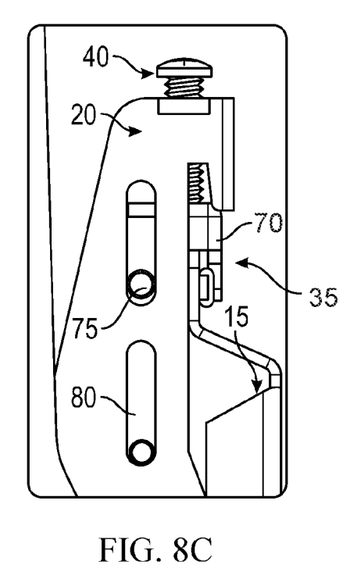
FIG. 8C illustrates a zoomed view of an exemplary height-adjustment mechanism.

FIGS. 8A-8B illustrate a sequence of side views of an exemplary height-adjustable flat panel display mount being height-adjusted. FIGS. 8A-8B illustrate an exemplary height difference with respect to the floor that may result when height-adjustment mechanisms 35 of vertical rails 20 are adjusted to varying degrees by way of screw 40. FIG. 8C also shows a zoomed view of an exemplary height-adjustment mechanism 35, including retainer member 70, height adjustment members 75, and slots 80. Persons of ordinary skill in the art will readily appreciate that the details of height-adjustment mechanism 35 shown herein is merely illustrative and that many other possible configurations are possible.

Figure 9A:
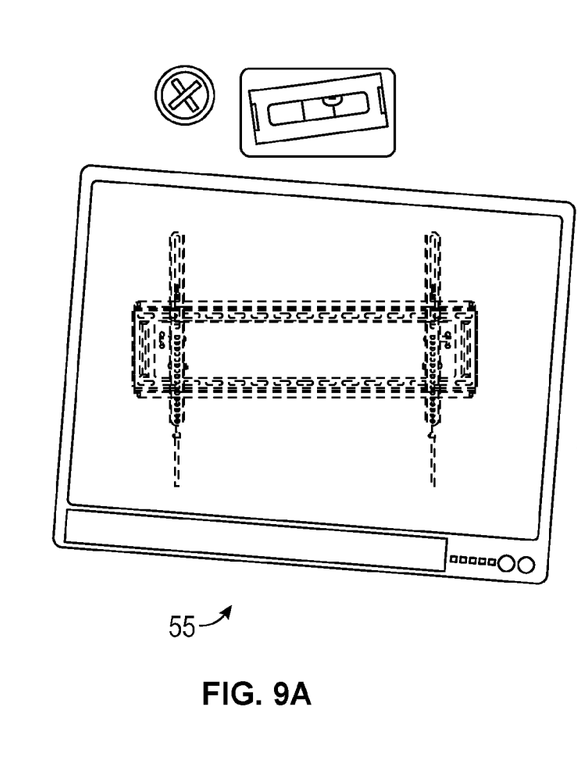
FIGS. 9A-9C illustrate a sequence of front and side views of a flat panel display coupled to an exemplary height-adjustable flat panel display mount that is being leveled without the use of specialty driving tools.
Figure 9B:
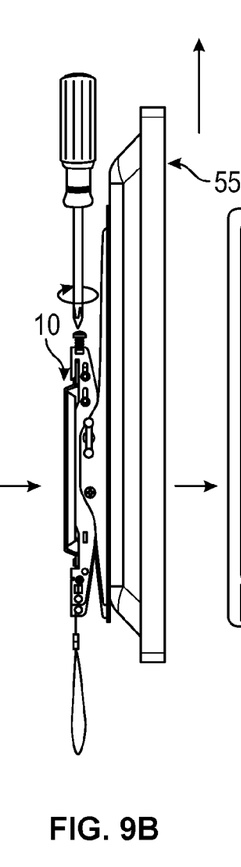
Figure 9C:
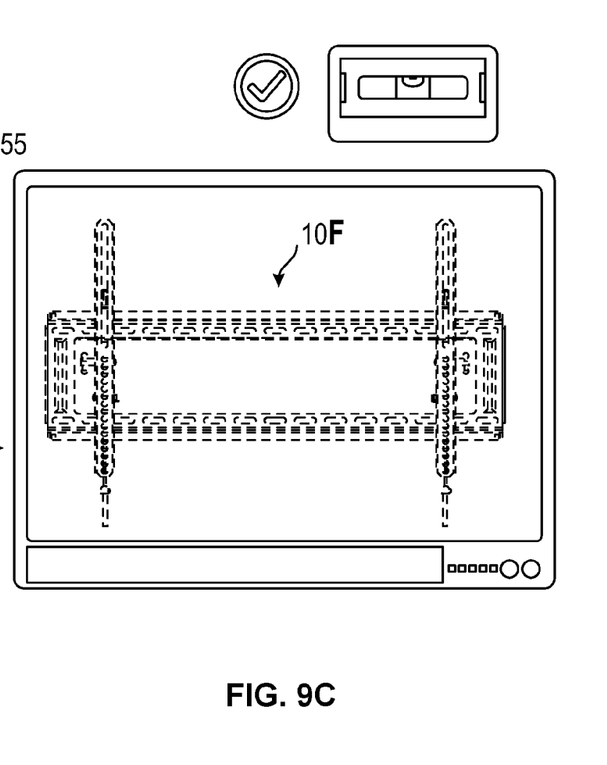

FIGS. 9A-9C illustrate a sequence of front and side views of a flat panel display coupled to an exemplary height-adjustable flat panel display mount that is being leveled without the use of any specialty driving tools. As shown beginning at FIG. 9A, height-adjustable flat panel display mount 10 is coupled to wall plate 15 (not shown because the viewer is standing in the longitudinal plane of the wall to which wall plate 15 is coupled) in such a way that causes vertical rails 20 of height-adjustable flat panel display mount 10 and flat panel display 55 coupled thereto to reside in an unleveled orientation. As shown in FIG. 9B, a user may remedy the unleveled orientation by adjusting the two height-adjustment mechanisms 35 without the need for specialty driving tools. In doing so, the user may achieve the level configuration shown in FIG. 9C.

The above description is illustrative and not restrictive. Many variations of the invention will become apparent to those of skill in the art upon review of this disclosure. While the present invention has been described in connection with a variety of embodiments, these descriptions are not intended to limit the scope of the invention to the particular forms set forth herein. To the contrary, the present descriptions are intended to cover alternatives, modifications, and equivalents as may be included within the spirit and scope of the invention as defined by the appended claim and otherwise appreciated by one of ordinary skill in the art.

What is claimed is:

1. A height-adjustable mount for mounting a flat panel display to a wall, the mount comprising:
    a wall plate configured to couple to the wall;
    a plurality of retaining members each directly coupled to a horizontal support member of the wall plate, each of said member including a horizontal rod and being stationary when coupled to the horizontal support member;
    a plurality of vertical rails configured to couple to the flat panel display, each of the vertical rails being independently adjustable to a plurality of heights with respect to a floor, and each of the vertical rails including a vertical slot coupled with the horizontal rod of one of the retaining members such that a height of the vertical rail with respect to the horizontal rod is adjustable, wherein each of the vertical rail is coupled to a subrail by a tilting mechanism; and
    a plurality of screws, each of the screws coupled to one of the vertical rails through a threaded hole in a top surface of the one vertical rail, wherein the screw is configured to be rotated in a first direction to drive the screw downward through the threaded hole to thereby elevate the vertical rail with respect to the floor, and the screw is configured to be rotated in a second direction opposite the first direction to drive the screw upward through the threaded hole and thereby lower the vertical rail with respect to the floor, wherein each of the retaining members is configured to remain stationary when the screw is rotated in either of the first or second directions.

2. The height-adjustable mount of claim 1, wherein the quantity of the plurality of retainers is no greater than two.

3. The height-adjustable mount of claim 1, wherein each stationary retaining member includes at least two horizontal rods.

4. The height-adjustable mount of claim 1, wherein the quantity of the vertical rails is no greater than two.

5. The height-adjustable mount of claim 1, wherein the wall plate comprises two stationary horizontal support members and a plurality of stationary vertical support members.

6. A height-adjustable mount for mounting a flat panel display to a wall, the mount comprising:
   a wall plate configured to couple to the wall;
   a plurality of retaining members each directly coupled to a horizontal support member of the wall plate, each retaining member including a vertical slot and being stationary when coupled to the horizontal support member;
   a plurality of vertical rails configured to couple to the flat panel display, each of the vertical rails being independently adjustable to a plurality of heights with respect to a floor, and each of the vertical rails including a horizontal rod coupled to the vertical slot of one of the retaining members such that a height of the horizontal rod within the vertical slot is adjustable; and
   a plurality of screws, each of the screws coupled to one of the vertical rails through a threaded hole in a top surface of the one vertical rail, wherein the screw is configured to be rotated in a first direction to drive of the screw downward through the threaded hole to thereby elevate the vertical rail with respect to the floor, and the screw is configured to be rotated in a second direction opposite the first direction to drive the screw upward through the threaded hole and thereby lower the vertical rail with respect to the floor, wherein each of the retaining members is configured to remain stationary when the screw is rotated in either of the first or second directions wherein each vertical rail includes a first subrail coupled to a second subrail by way of a tilting mechanism.

7. The height-adjustable mount of claim 6, wherein the quantity of the plurality of retainers is no greater than two.

8. The height-adjustable mount of claim 6, wherein each vertical rail includes at least two horizontal rods.

9. The height-adjustable mount of claim 6, wherein the quantity of the vertical rails is no greater than two.

10. The height-adjustable mount of claim 6, wherein the wall plate comprises two stationary horizontal support members and a plurality of stationary vertical support members.

11. A height-adjustable mount for mounting a flat panel display to a wall, the mount comprising:
    a wall plate configured to couple to the wall;
    a plurality of retaining members each directly coupled to a horizontal support member of the wall plate, each retaining member including a vertical slot and being stationary when coupled to the horizontal support member;
    a plurality of vertical rails configured to couple to the flat panel display, each of the vertical rails is independently adjustable at a plurality of heights with respect to a floor, and each of the vertical rails including a horizontal rod coupled to the vertical slot of one of the stationary retaining members such that a height of the horizontal rod within the vertical slot is adjustable; and
    a plurality of screws, each of the screws coupled to one of the vertical rails through a threaded hole in a top surface of the one vertical rail, wherein the screw is configured to be rotated in a first direction to drive the screw downward through the threaded hole to thereby elevate the vertical rail with respect to the floor, and the screw is configured to be rotated in a second direction opposite the first direction to drive the screw upward through the threaded hole and thereby lower the vertical rail with respect to the floor, wherein each of the retaining members is configured to remain stationary when the screw is rotated in either of the first or second directions.

* * * * *

UNITED STATES PATENT AND TRADEMARK OFFICE
CERTIFICATE OF CORRECTION

PATENT NO. : 9,829,151 B1
APPLICATION NO. : 14/602218
DATED : November 28, 2017
INVENTOR(S) : Brett Stenhouse It is certified that error appears in the above-identified patent and that said Letters Patent is hereby corrected as shown below:

In the Claims

Column 7, Line 27, Claim 6    Delete "to drive of",
Insert --to drive--

Signed and Sealed this
Twenty-seventh Day of November, 2018

Andrei Iancu
*Director of the United States Patent and Trademark Office*